May 21, 1935.  J. A. JENSEN  2,002,472
HOSE COUPLING
Filed May 16, 1934   2 Sheets-Sheet 1
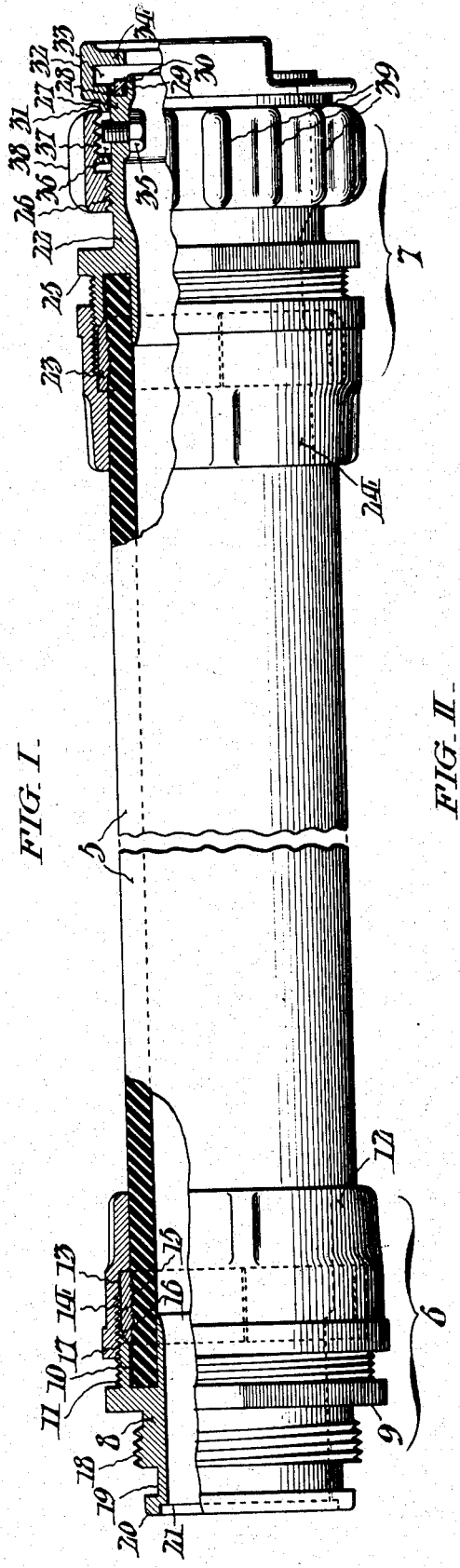
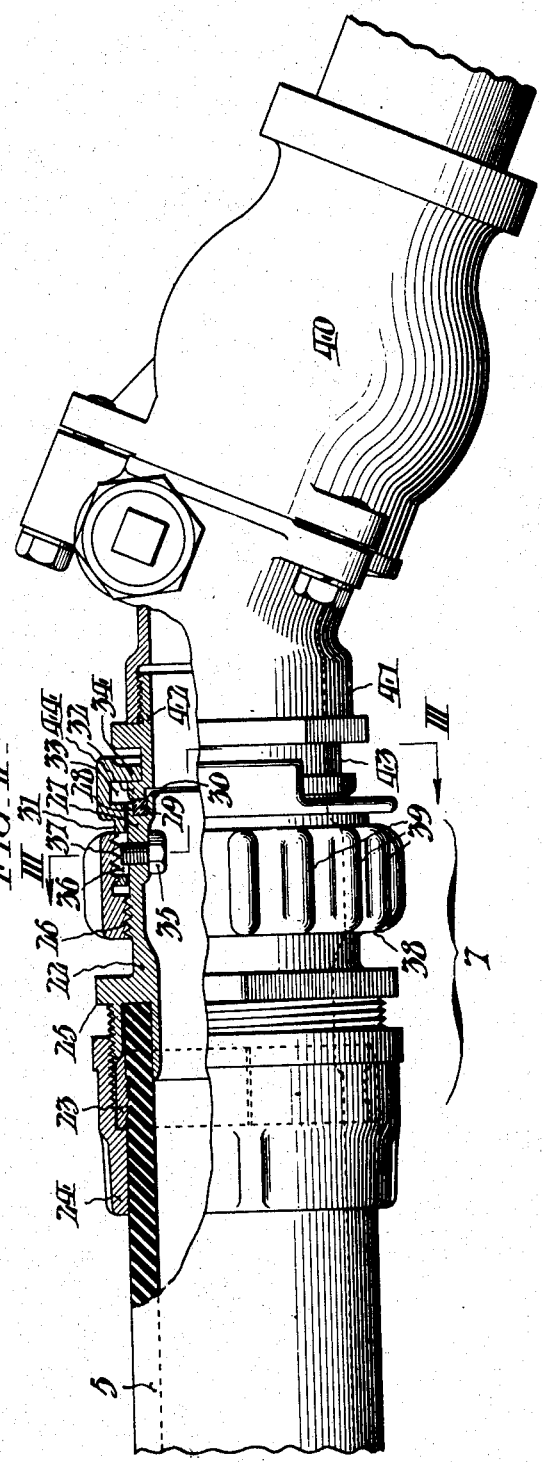
INVENTOR:
James A. Jensen,
BY Fraley Paul
ATTORNEYS.

May 21, 1935.  J. A. JENSEN  2,002,472
HOSE COUPLING
Filed May 16, 1934   2 Sheets-Sheet 2
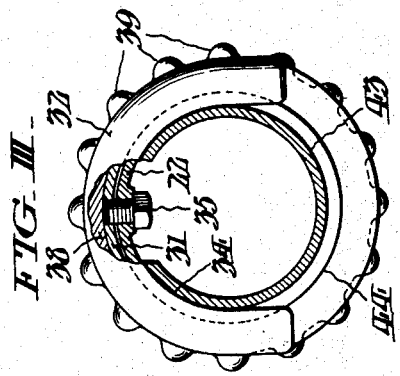
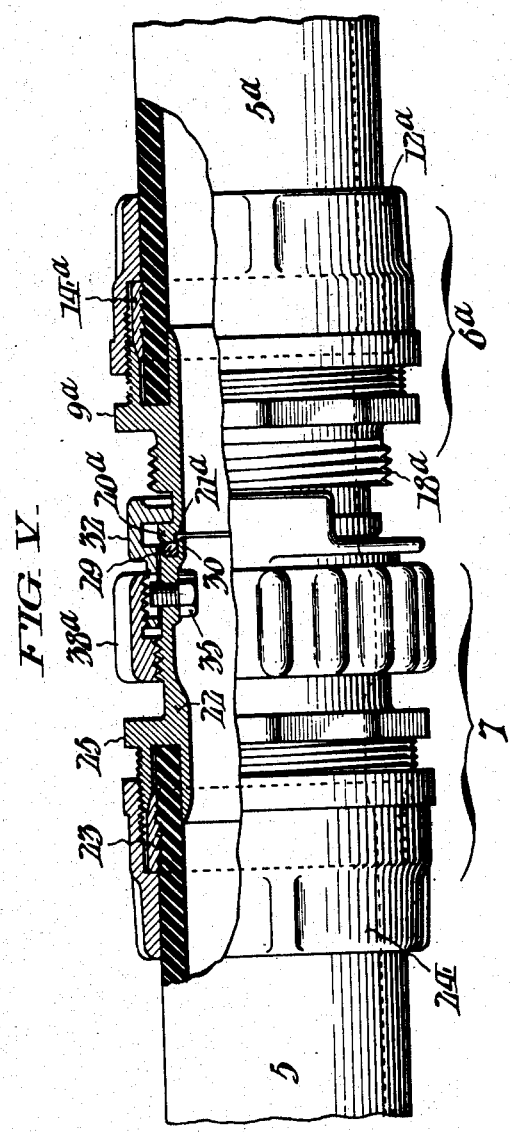
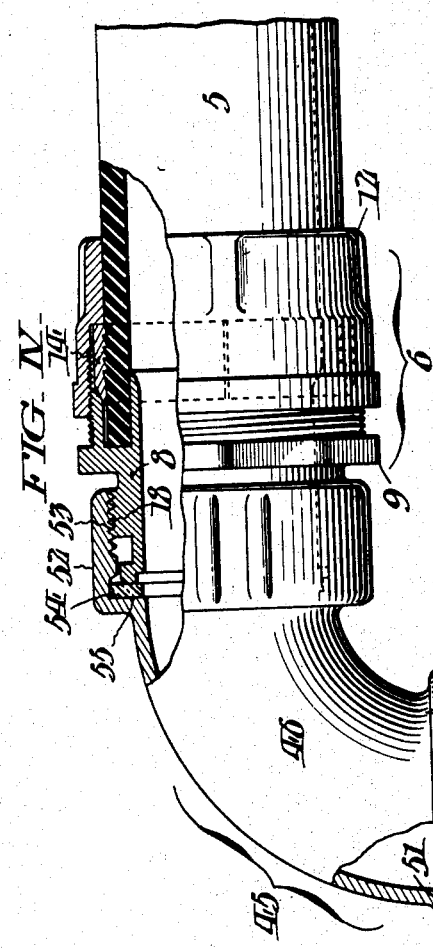
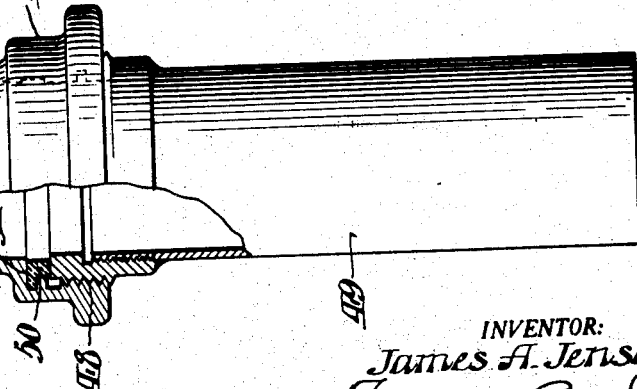
INVENTOR:
James A. Jensen
BY Fraley Paul
ATTORNEYS.
WITNESSES:
John E. Bergner
Thomas W. Kerr, Jr.

Patented May 21, 1935

2,002,472

UNITED STATES PATENT OFFICE 2,002,472

HOSE COUPLING

James A. Jensen, Philadelphia, Pa., assignor to Quaker City Iron Works, Philadelphia, Pa., a corporation of Pennsylvania Application May 16, 1934, Serial No. 725,961

3 Claims. (Cl. 285—143)

This invention relates to hose couplings; and it has reference more particularly to couplings for hose such as are used in connection with tank vehicles employed in the delivery of gasoline, lubricating oils and other liquid commodities.

The couplings ordinarily associated with hose of the kind referred to are of the bulky and heavy swivel joint type, and considerable time is required in connecting such hose to the drain faucets of the vehicle tanks, as well as in connecting together several sections of the drain hose. The manipulation of the swivel couplings moreover entails the aid of special and cumbersome tools which are apt to be misplaced or lost.

The main object of my invention is to overcome the drawbacks to which attention has been directed above. In other words, it has for its chief aim the provision of a hose coupling which will make possible the quick connection of several hose sections, or the connection of any one of such sections to the drain faucet of a tank vehicle without necessitating the employment of special manipulating instrumentalities.

Another object of my invention is to provide a hose coupling, which, in addition to having the aforementioned attributes, will permit connection of a conventional form of discharge tip to any one of the hose sections.

Further objects and attendant advantages of this invention will be manifest from the detailed description which follows of the accompanying drawings; wherein, Fig. I is a broken-out view, partly in elevation and partly in section, of a hose section having quick attachable and detachable coupling fittings embodying the present improvements.

Fig. II is a fragmentary view, likewise partly in elevation and partly in section, showing the hose section coupled with the drain faucet of a tank vehicle.

Fig. III is a cross sectional view taken as indicated by the arrows III—III in Fig. II.

Fig. IV is a fragmentary view similar to Fig. II showing how an elbow discharge nozzle may be connected to one end of the hose section; and, Fig. V is a fragmentary view showing how two hose sections may be connected by means of my improved couplings.

In Fig. I there is illustrated a hose section 5 which may be of a convenient length for ready carriage on a tank vehicle, and which in itself may be of any suitable composite construction which will readily yield to flexure and bending. Permanently attached to opposite ends of the hose 5 are complemental fittings 6 and 7 which, taken together, constitute the coupling with which the present invention is more particularly concerned. As shown, the fitting 6 comprises an internally-smooth tubular component 8 which is provided with a medially-allocated polygonal nut flange or head 9. The portion of the component 8 rearward of the nut head 9 has an annular recess 10 to receive the corresponding end of the hose 5, it being particularly noted that the inner wall of said recess extends well beyond the outer wall; and said component is provided exteriorly with a relatively fine screw thread 11 for engagement by the internal thread of a sleeve nut 12 which surrounds the hose end. Located within the shouldered hollow 13 of the sleeve nut 12 is a split clamp ring 14 having internal tooth ridges or serrations 15, and a beveled frontal edge 16 to cooperate with an opposing bevel 17 on the member 8. Obviously, by virtue of this arrangement, as the sleeve nut 12 is drawn up, the split clamp ring 14 is circumferentially contracted by the wedging action of the bevels 16, 17, with the result that its internal tooth ridges or serrations 15 are firmly embedded in the material of the hose 5, and supported by the inner wall of the recess 10 as a firm backing therefor, whereby the fitting 6 is tightly and permanently secured to the hose end. Immediately forward of the nut flange 9, the member 8 has a short shouldered portion 18 with a comparatively coarse right-hand screw thread which is separated by a rectangular-section circumferential groove 19 from an end flange 20. For a purpose later on explained, the flanged end of the member 8 is axially recessed as at 21.

The fitting 7 at the opposite end of the hose section 5 comprises a tubular member 22, which, like the member 8 of the fitting 6 is permanently secured to the hose end by means of a split clamp ring 23 and cooperative sleeve nut 24, and which is formed, outwardly of a nut flange 25, with a coarse right-hand screw threaded portion 26 whereof the diameter and the thread pitch is exactly the same as that of the portion 18 of the first described fitting 6. However, instead of being flanged like the member 8 of the fitting 6, the outer end of the member 22 of the fitting 7 is made plain cylindric as at 27, and formed in its annular cross face with a recess 28 wherein is lodged a square section resilient or compressible ring gasket 29. The inner circumferential wall of the recess 28, it will be noted, is extended slightly to form an axially-projecting annular lip 30. The fitting 7 also comprises a sleeve 31 that telescopically fits the plain cylindric end portion 27 of the member 22. At its outer end, the sleeve 31 is formed with an internally-recessed hood or shroud flange 32 which is of substantially semi-circular configuration as shown in Fig. III, said flange having an internal recess 33 of a width equal to that of the end flange 20 of the member 8 of the fitting 6. The inner edge curvature 34 of the flange 32 is of a radius to fit the curvature of the recessed portion 19 of the member 8 aforesaid. A screw bolt 35 threaded into an aperture in the member 22 projects into a longitudinal slot 36 in the sleeve 31 which latter is thus held against rotation with respect to the member 22 but capable of limited axial sliding movement relative thereto. At its inner end the sleeve 31 has a left-hand screw thread 37 of a pitch corresponding to that of the right-hand thread 26 on the member 22. As shown, the screw threads 26 and 37 are engaged by the internal right and left-hand threads of an adjusting nut collar 38 which is provided with circumferentially spaced grasp projections 39 for convenience of hand manipulation.

The drain faucet generally designated by the numeral 40 in Fig. II may be of a standard type such as is ordinarily used on tank vehicles, having a thread internally of its mouth or outlet 41. Into the faucet outlet 41 is screwed an adapter 42 with a neck 43 and with an axially recessed end flange 44 which respectively correspond exactly to the portions 19 and 20 of the fitting 6.

To connect the hose section 5 with the faucet 40, the hood or shroud flange 32 of the fitting 7 is "hooked" or engaged downward over the end flange 44 of the adapter 42, whereupon the nut collar 38 is rotated anti-clockwise in Fig. III. By differential action of the right and left-hand screw threads 26 and 37, the tubular member 22 is drawn inwardly of the coupling 7 with the result that the gasket 29 is compressed to form a fluid tight seal between the opposing end faces of said member 22 and the adapter 42. Incidentally, the annular lip 30 on the member 22 engages the axial recess of the adapter 42 on the faucet 40 to axially align the parts and to hold the fitting 7 against the possibility of subsequent lateral displacement in respect to the faucet.

In Fig. IV, I have shown how a discharge nozzle 45 may be quickly attached to the hose section 5 at the fitting 6. This nozzle 45 is in itself of well known construction, and comprises a rounded elbow 46 with a bell 47 at one end thereof which is internally threaded as at 48 for reception of a removable nozzle tip 49, a sealing gasket 50 compressed between the upper end of the tip 49 and an annular shoulder 51 within the bell 47 insuring a fluid-tight joint. The opposite end of the elbow 46 is also enlarged as at 52 and threaded internally as at 53 to fit over and engage the screw portion 18 of the fitting 6. Here also a gasket 54 is used between the flanged end of the coupling 6 and the internal shoulder 55 of the enlarged elbow end 52 for the purposes of fluid-tightness.

Fig. V illustrates how two hose sections 5 of my invention can be quickly connected. As shown, this is effected simply by engaging the hook or shroud flange 32 of the coupling 7 on the hose section 5 over the outwardly-projecting circumferential end flange 20a of the fitting 6a on the section 5a, and turning the nut collar 38a to effect compression of the gasket 29 and to engage the annular lip 30 of the coupling 7 within the axial recess 21a of the coupling 6a. There is thus formed a fluid-tight juncture in exactly the same manner as described in connection with the coupling of the hose section 5 with the drain faucet 40.

My invention thus makes possible the quick connection of two hose sections, or the quick connection of a hose to the drain faucet of a tank vehicle or the like without the aid of tools.

Having thus described my invention, I claim:

1. A hose coupling of the type described comprising a tubular fitting having a manipulator enlargement intermediate its ends, an annular longitudinal recess in said fitting to one side of the enlargement for connecting-reception of a hose end, a shouldered portion at the other side of said enlargement having a comparatively coarse right-hand screw-thread with a plain cylindrical extension; a sleeve slidably fitting said extension with means preventing its rotation relative thereto, said sleeve having an exterior left-hand screw-thread, of corresponding pitch to the plain shouldered portion right-hand screw-thread, and embodying a shroud flange for engagement over the terminal flange of an axially-aligning fitting; and an adjuster nut collar having internal right and left-hand screw-threaded portions for cooperation with the extension and sleeve threaded parts to effect coupling connection of an aligned fitting or attachment of the coupling to a drain outlet.

2. A hose coupler fitting as claimed in claim 1, wherein the manipulator enlargement is in the form of a suitably-shaped flange, the inner wall of the longitudinally recessed portion extends well beyond the outer wall thereof, and the other end of said fitting embodies a circumferential flange with a terminal recess.

3. A hose coupler fitting as claimed in claim 1 wherein the manipulator enlargement is in the form of a polygonally-shaped flange, the inner wall of the longitudinally recessed portion extends well beyond the outer wall thereof, and the other portion of the fitting embodies a plain cylindrical extension, beyond the screw-threaded part, with a rectangular recess in its annular cross face.

JAMES A. JENSEN.